United States Patent
Farrugia et al.

(10) Patent No.: US 8,755,521 B2
(45) Date of Patent: Jun. 17, 2014

(54) SECURITY METHOD AND SYSTEM FOR MEDIA PLAYBACK DEVICES

(75) Inventors: Augustin J. Farrugia, Cupertino, CA (US); Mathieu Ciet, Paris (FR); Pierre Betouin, Boulogne (FR)

(73) Assignee: Apple Inc., Cupertino, CA (US)

( * ) Notice: Subject to any disclaimer, the term of this patent is extended or adjusted under 35 U.S.C. 154(b) by 1512 days.

(21) Appl. No.: 12/118,526

(22) Filed: May 9, 2008

(65) Prior Publication Data

US 2009/0282245 A1    Nov. 12, 2009

(51) Int. Cl.
*H04L 29/06* (2006.01)
(52) U.S. Cl.
USPC ............ 380/201; 713/189; 713/156; 713/171
(58) Field of Classification Search
USPC ........................................................ 380/201
See application file for complete search history.

(56) References Cited

U.S. PATENT DOCUMENTS

| | | | |
|---|---|---|---|
| 6,345,256 B1* | 2/2002 | Milsted et al. | 705/64 |
| 6,697,944 B1* | 2/2004 | Jones et al. | 713/168 |
| 7,581,244 B2* | 8/2009 | Li et al. | 726/5 |
| 7,975,312 B2* | 7/2011 | Broderson et al. | 726/30 |
| 2005/0075986 A1* | 4/2005 | You et al. | 705/71 |
| 2005/0097033 A1* | 5/2005 | Pretell et al. | 705/38 |
| 2007/0124583 A1* | 5/2007 | Andersson et al. | 713/165 |
| 2008/0170700 A1* | 7/2008 | Darba | 380/278 |
| 2010/0031034 A1* | 2/2010 | Kim | 713/165 |

OTHER PUBLICATIONS

U.S. Appl. No. 11/651,339, filed Jan. 8, 2007, by Brodersen et al.

\* cited by examiner

*Primary Examiner* — Mohammad L Rahman
(74) *Attorney, Agent, or Firm* — Adeli LLP

(57) ABSTRACT

A Digital Rights Management (DRM) system for distribution of digital content such as audio or video uses a method to enhance security of the content from unauthorized access and use, including access by unauthorized players. The method does not necessarily require a token exchange and thereby minimizes storage demands on the server which distributes the digital content. The system generates and distributes keys for decryption of the digital content whereby the keys are unique to a specific player and user account.

24 Claims, 1 Drawing Sheet

SECURITY METHOD AND SYSTEM FOR MEDIA PLAYBACK DEVICES

FIELD OF THE INVENTION

This invention relates to Digital Rights Management (DRM) for protection of digital content, for instance including but not limited to audio and/or video data, in a playback device such as a computer or computing device or audio or video media player.

BACKGROUND

The protection of digital content transferred between computers over a network and transferred from a computer or other host device or a server to an associated playback device is important for many organizations. The DRM process often involves encrypting the pieces of content (e.g., encrypting the binary form of the content) to restrict usage to those who have been granted a right to the content, which is for instance pieces of music or video programs.

Cryptography is the traditional protection method, but for many digital file transfer situations, a party that legitimately receives the content might try to break the DRM protection scheme, so as to give illicit access to third parties. Hence, an identified weak link in the DRM security is in the overall process, rather than the encryption scheme. For instance, one of the more successful DRM schemes distributes music and video content via the Internet. The DRM system distributes to a user's computer content that has been encrypted. Typically the content in encrypted form may also be downloaded, via a local connection such as a USB (Universal Serial Bus) connection, to an associated playback-only device such as an audio or video media player.

The present inventors have identified a potential security issue with this approach. There is a need to strengthen the security linking a particular playback device to the associated host device (computer) and also to the central server from which the content and/or DRM information is downloaded.

SUMMARY

In accordance with the invention, a "slave" playback (player) device, such as a media player or computer or computing device, is linked to an associated "master" host device, such as another computer or computing device, and to a central server, by a protocol (process) intended to guarantee that before any content is made available for play on the playback device, the genuineness of the playback device is established, in the sense that it indeed is authorized to receive and play the content. This improvement in the DRM system is intended to strengthen the overall system security, and especially to better secure the content (typically copyrighted material) from authorized access or use.

Thereby, a three way exchange is provided which involves the content and/or DRM central server, or other source of the content or DRM information, the computer-like host or master device (such as a computer, cell phone, PDA, etc.) and the playback device also referred to here as the player (such as a media player including the Apple TV digital media receiver sold by Apple Inc., but which also may be a cell phone or PDA.) Note that the central server may be in fact be a group of servers, such as an on-line music and video "store" selling such material. In some cases, the player has no user keypad (such as when it is a media player device), so the present process is intended in one embodiment to avoid the user of the player from having to enter authorization passwords, etc. into the player, since that would be inconvenient. In the present process, the host device is first conventionally authorized to communicate with the server. Then a DRM security protocol, of conventional type, is exchanged between the host device (which is for this process the "master" in computer network nomenclature) and the player (which is the "slave") when they are paired. Note the references here to the "host device" more particularly refer to a digital media player software application (computer program) for playing and organizing digital music and video files, and executed on a computer or equivalent. The program is also an interface to manage the content stored on a linked player, and allows connection to the server to download (typically purchased) digital content. Such applications are well known and typically supported on computers running various operating systems, such as the Apple Mac OS, and may also run on other computer-like-devices such as cell phones, PDAs, etc.

After the protocol exchange, the player and host device each thereby have in their appropriate memory areas (storage) the conventional authorization certificate of the other device and an encryption key which is typically for a symmetric cipher. The host device then sends to the server certain DRM related information, and the player sends to the server a request for a set content related decryption keys. After processing at the server, that set of keys is sent to the player and the keys are unique to that player and account. In one embodiment the player is equipped with the requisite components and software to connect to the Internet for instance, and thereby directly to the central server, bypassing the host device.

To further describe this exchange process, the host device requests a "keybag" (set of content keys) for its associated player. The keybag generated in response by the server is only for that associated player and useless for any other player. By means of authentication protocols and the way the keybag is configured, any other player that tried to play a content item using that keybag to decrypt the content item, even if able to authenticate itself, would not be able to decrypt the content item since the keybag is unique to that one particular player.

The present exchange process is not limited to one between a player and host device coupled by wires. The connection may be wireless, or may be between two or more software programs or through a software daemon.

See also U.S. patent application Ser. No. 11/651,339, now issued as U.S. Pat. No. 7,975,312, inventors Rainer Broderson et al., filed Jan. 8, 2007, "Token Passing Technique for Media Playback Devices" incorporated by reference herein in its entirety.

DETAILED DESCRIPTION

Figure 1:
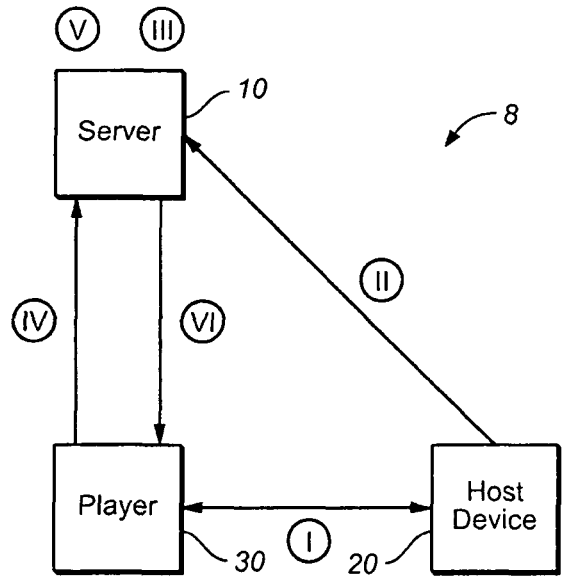
FIG. 1 shows a diagram illustrating the present method and system.

FIG. 1 shows a content distribution system 8 and the present method. This process, unlike that of U.S. Ser. No. 11/651,339, now issued as U.S. Pat. No. 7,975,312, in the presently disclosed embodiments is tokenless. System 8 includes a conventional (central) server 10, which conventionally stores a large library of purchasable media content and the DRM information associated therewith; server 10 may in fact be a set of servers, representing, e.g., an online music and/or video store such as the Apple "iTunes Music Store". In communication with server 10 is the host device 20, of the type described above, and linked thereto via the Internet or other data network. Also in communication for DRM and download purposes with host device 20 is the media player 30, such as a conventional audio (music) and/or video player such as the Apple TV digital receiver (set top box). Player 30 usually connects to host device 20 by a local connection, such as a USB cable or wireless connection, but this is not limiting. As shown, in some embodiments player 30 also has the capability to directly communicate with the server, both for DRM purposes and also to download media content, such as by an Internet connection. In a typical situation, a consumer owns player 30 and host device 20, and obtains content (programs) for player 30 using the digital media player software application resident on host device 20. Host device 20 can usually also itself play the content. The numbered lines in FIG. 1 denote the passage of particular DRM information as described below, with similar numbering. It is to be understood that the present process is in addition to the conventional DRM scheme as described above, also operative on the FIG. 1 system, involving content encryption and the associated decryption keys.

Referring to the numbered lines in FIG. 1, initially it is understood that a conventional shared DRM security protocol has already been implemented, and that host device 20 authorized thereby by server 10 to begin the following process.

I. A conventional DRM security association protocol (SAP) is exchanged between the host device 20 and the player 30 when they are paired. After a successful SAP exchange these devices have in their memories respectively:

Player:

An authorization certificate of the host device. The authorization certificate (also referred to as a certification attribute certificate) is conventional in the computer field and is a digital document that describes a written permission from the associated device to use a service or resource that the issuing associated device controls or has access to use.

A symmetric encryption key derived from the SAP exchange (symmetric meaning that the same key is used for encryption and decryption on both sides).

Host Device

The authorization certificate of the player.

The same symmetric encryption key mentioned above.

The player also obtains from the host device the following information (used in the next part of the process):

The GUID of the host device. GUID is a standard term referring to a number used in the computer field to identify a component, file, user, etc. The GUID is used here as a unique device identifier for, e.g., a computer, mobile device, or set top box.

The account name (an account identification number which is unique and conventionally associated with the particular user of the host device or the host device itself, relative to the server).

The user credentials for access to the account (the user is the account owner)

II. The host device sends the following to the server to prepare the request for the keybag for the player:

The account ID (which is different from the account name) and is a unique key identifier for a particular account; this key is not a cryptographic key but refers to a database query language.

The GUID of the host device (the source GUID)
The GUID of the player (the destination GUID)
An authentication string which is equal to the value of=HMAC_HASH (host device GUID+player GUID+Account ID+transformed account key+Key ID of the transformed account key). Here HMAC_HASH refers to a well known mathematical function which is a hash (one way) function based message authorization code well known in cryptography; well known types of HMAC are MD5, SHA, and others. The account key is a cryptographic key which protects a group of content keys, such as those keys associated with a given account. Each key has an associated ID (identifier). Each key is conventionally obfuscated in storage (memory), and an obfuscated key is considered to be "transformed." Here the authentification uses information known to the authenticating device. The key ID is used to identify the cryptographic key for a particular content item.

The key ID of the selected transformed account key The user credentials for the account. The user credentials are preferably not stored in the clear for security reasons. An example of a user credential is a "salted" hash of the concatenated user name and user password.

III. The server stores the following values in a database in its memory that will be searched when the key bag request from the player is received subsequently:

The account ID
The GUID of the host device (the source GUID)
The GUID of the player (the destination GUID)
The user credentials for the account
An alternative for this step is to store a hash function of these values in the database to enhance security.

IV. The player sends a request for the keybag conventionally needed to decrypt a content item to be distributed from the server. (Note that the keybag conventionally is updated for each new content item delivered to the host device. The player then sends to the server:

The player GUID
The host device GUID
The account ID
The player authorization certificate
The player authorization certificate size (its length in bits)
V. The server searches in its database if a keybag request for this player has earlier been made for this account and for this player. If such a request has been made previously, the server generates the keybag dedicated to the player. Generation of the keybag is conventional. Note that the keybag must be updated for each new content item delivered to the host device or player. Also if a keybag is lost it must be resent to the host device. If there has been no previous keybag request, the server generates a keybag and toggles the "generation flag" of this host device in the server database.

If a hash function has been applied in step III, it is also possible to do this search on the resulting hash function value since it is possible to link the request to the data stored previously.

VI. The player receives the DRM keys (the keybag) from the server for that specific account and host device.

At VI, the player receives the relevant keybag from the server and stores it in its key storage (memory), also referred to as a key depository. The received DRM key(s) in the keybag then are used conventionally by the player to decrypt the associated digital content, which is separately transferred to player 30 conventionally from the server.

Figure 2:
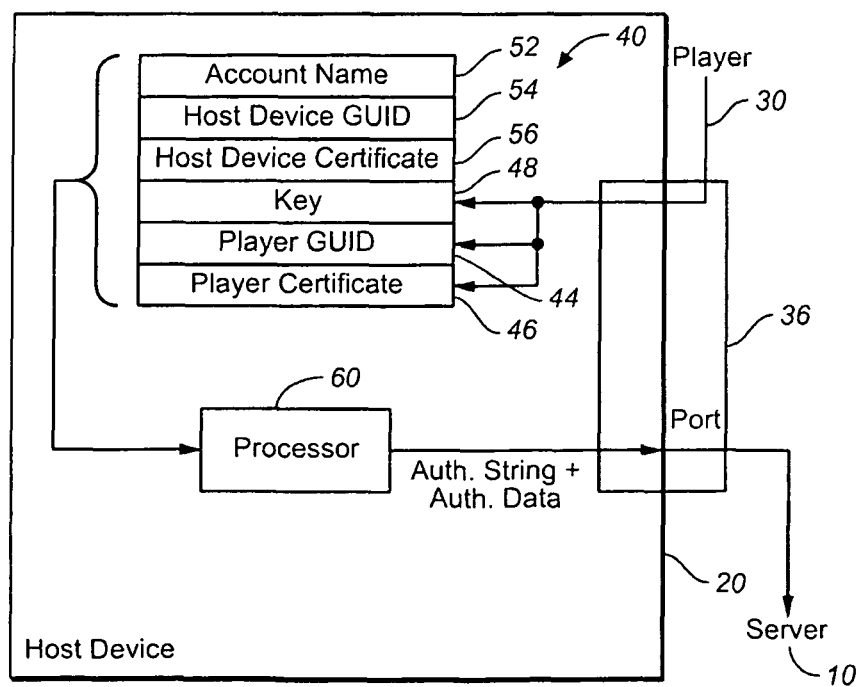
FIG. 2 is a block diagram of the DRM portion of the host device of the FIG. 1 system.

FIG. 2 shows in a block diagram relevant detail of the host device 20 of FIG. 1, emphasizing the DRM portion of the host device relevant to this disclosure. Host device has a conventional input/output port 36, such as a USB interface or wireless interface, for connecting to player 30 and also suitable for coupling to the server 10, such as by an Internet connection. (Of course, this port may be implemented as two separate ports.) Coupled to port 36 is a processor (such as logic or a microprocessor) 60. Also provided are the DRM storage locations 40, typically some type of secure storage, which inter alia stores the GUID of the player at 44, and the authentication certificate of the player at 46 and the key at 48 as well as storage allocated for the account name 52 and the host device's GUID at 54 and certificate at 56. DRM storage 40 is accessed by the processor 60, which assembles the host device identification and authentication information therefrom and transmits it to server 10 via port 36. Processor 60 also carries out the other aspects of the present process at the host device as explained herein for purposes of the above described security exchange.

It is to be understood that the process of FIG. 1 is typically carried out by a combination of computer hardware and software, portions of which are resident in each of the server, host device and player. The software is readily coded in light of this description, and typically is part of the otherwise conventional DRM code present in each of the server, host device, and player, and originally coded as source code in a computer language such as C++, and executed in object code or other form by the processor in each entity (such as processor 60 in FIG. 2) where the object code is conventionally resident on a computer readable storage medium (such as a computer memory) in or associated with each of these entities.

This disclosure is illustrative and not limiting; further modifications and improvements will be apparent to one skilled in the art in light of this disclosure, and are intended to fall within the scope of the appended claims.

We claim:

1. A method comprising:
   at a player slave device that connects to a host master device having a resident player software application, in order to receive a cryptographic key from an external source of content, exchanging first authentication data and identification data with the host master device, wherein the player slave device is in a slave-master pairing with the host master device and wherein the first authentication data includes an authentication certificate and an encryption key;
   after the external source of content has received second authentication data pertaining to the host master device and the player slave device from the host master device, sending a request for at least one cryptographic key from the player slave device directly to the external source, wherein the request bypasses the host master device; and
   receiving at the player slave device directly from the external source and bypassing the host master device, in response to the request, at least one cryptographic key relating to encryption or decryption of content to be distributed, the at least one key being unique to the player slave device.

2. The method of claim 1, wherein the player slave device is one of a media player, a cellular telephone, and a PDA.

3. The method of claim 1, wherein the second authentication data sent to the external source includes a global universal identifier of each of the host master device and the player slave device, and additional authentication data pertaining to the global universal identifiers.

4. The method of claim 3, wherein the additional authentication data includes a hash function of the global universal identifiers.

5. The method of claim 4, wherein the hash function is also a hash of an obfuscated account key.

6. The method of claim 1, wherein the identification data includes an encryption key and a certificate of each of the player slave device and the host master device.

7. The method of claim 1, wherein the player slave device additionally receives a keybag.

8. A non-transitory computer readable medium carrying computer code for performing the method of claim 1.

9. An apparatus programmed to perform the method of claim 1.

10. The method of claim 1, wherein the external source is a server.

11. The method of claim 1, wherein the host master device communicates with the external source via the Internet.

12. The method of claim 1, wherein the player slave device communicates with the host master device via a local connection.

13. A method comprising:
    at a player slave device that connects to a host master device having a resident player software application, in order to receive a cryptographic key from an external source of content, exchanging first authentication data and identification data with the host master device, wherein the player slave device is in a slave-master pairing with the host master device and wherein the first authentication data includes an authentication certificate and an encryption key;
    sending a cryptographic key request from the player slave device directly to the external source of content, wherein the key request bypasses the host master device, the key request including the first authentication data for the player slave device; and
    receiving at the player slave device directly from the external source and bypassing the host master device, in response to the key request, at least one cryptographic key relating to encryption or decryption of content to be distributed, the at least one cryptographic key being unique to the player slave device.

14. The method of claim 13, wherein the player slave device is one of a media player, a cellular telephone, and a PDA.

15. The method of claim 13, wherein the identification data sent to the host master device includes a global universal identifier of the player slave device, and an encryption key.

16. The method of claim 13, wherein the key request includes a global universal identifier of the player slave device and of the host master device.

17. The method of claim 13, wherein the key request includes a unique account identifier.

18. The method of claim 13, wherein the key request includes account credentials.

19. The method of claim 13, wherein the player slave device further receives a keybag.

20. A non-transitory computer readable medium carrying computer code for carrying out the method of claim 13.

21. An apparatus programmed to carry out the method of claim 13.

22. The method of claim 13, wherein the external source is a server.

23. The method of claim 13, wherein the player slave device communicates with the external source via the Internet, and with the host master device via a local connection.

24. The method of claim 23, wherein the local connection is one of a universal serial bus, a wireless connection, and a local area network.

* * * * *